United States Patent
Kim et al.

(10) Patent No.: US 9,680,524 B2
(45) Date of Patent: Jun. 13, 2017

(54) METHOD OF TRANSMITTING SIGNAL, AND APPARATUS FOR PERFORMING THE SAME

(71) Applicants: Samsung Electronics Co., Ltd., Suwon-si (KR); KWANGWOON UNIVERSITY INDUSTRY-ACADEMIC COLLABORATION FOUNDATION, Seoul (KR)

(72) Inventors: Jong Jin Kim, Hwaseong-si (KR); Hyuk Jun Oh, Seoul (KR); Dong Wook Kim, Seoul (KR)

(73) Assignees: Samsung Electronics Co., Ltd., Suwon-si (KR); Kwangwoon University Industry-Academic Collaboration Foundation, Seoul (KR)

(*) Notice: Subject to any disclaimer, the term of this patent is extended or adjusted under 35 U.S.C. 154(b) by 203 days.

(21) Appl. No.: 14/576,954

(22) Filed: Dec. 19, 2014

(65) Prior Publication Data

US 2015/0181598 A1 Jun. 25, 2015

(30) Foreign Application Priority Data

Dec. 20, 2013 (KR) .................. 10-2013-0160614

(51) Int. Cl.
*H04B 1/7183* (2011.01)
*H04B 1/69* (2011.01)

(52) U.S. Cl.
CPC ..... *H04B 1/7183* (2013.01); *H04B 2001/6908* (2013.01)

(58) Field of Classification Search
None
See application file for complete search history.

(56) References Cited

U.S. PATENT DOCUMENTS

| 2006/0188002 | A1 | 8/2006 | Rouault et al. | |
| 2007/0248114 | A1* | 10/2007 | Jia | H04B 1/71632 370/465 |
| 2010/0074366 | A1* | 3/2010 | Jia | H04L 1/1854 375/295 |
| 2010/0086073 | A1* | 4/2010 | Jia | H04B 1/7176 375/267 |

* cited by examiner

*Primary Examiner* — Gary Mui
(74) *Attorney, Agent, or Firm* — NSIP Law

(57) ABSTRACT

A signal transmission method and apparatus are provided. A signal transmission apparatus may include a time hopping apparatus configured to calculate a difference between values of time hopping patterns corresponding to adjacent symbol transmission periods, and to determine, based on the calculated difference, whether a position of a time hopping pattern corresponding to one of the adjacent symbol transmission periods is to be adjusted, and a transmitter configured to transmit a signal in the adjacent symbol transmission periods based on a determination result obtained by the time hopping apparatus. Additionally, a related signal reception apparatus is provided.

20 Claims, 8 Drawing Sheets

METHOD OF TRANSMITTING SIGNAL, AND APPARATUS FOR PERFORMING THE SAME

CROSS-REFERENCE TO RELATED APPLICATIONS

This application claims the benefit under 35 USC 119(a) of Korean Patent Application No. 10-2013-0160614 filed on Dec. 20, 2013, in the Korean Intellectual Property Office, the entire disclosure of which is incorporated herein by reference for all purposes.

BACKGROUND

1. Field

The following description relates to a signal transmission method that is robust against signal interference, and a signal transmission apparatus for performing the signal transmission method.

2. Description of Related Art

Due to greatly increased interest in home networks, wireless personal area network (WPAN) technology is receiving attention. WPAN technology is a personal wireless networking solution used over a short distance, for example, about 10 meters (m). Because it is easy to use the WPAN technology without a need for physical wiring, the WPAN technology is receiving more attention than wired home networking technology, for example, Ethernet, power line communication (PLC), home phoneline network alliance (PNA), and other wired approaches. Additionally, the WPAN technology is potentially available for use in low-power body area network (BAN) communication.

An ultra-wideband (UWB) communication technology refers to a technology for implementing a WPAN in a frequency band of 3.1 gigahertz (GHz) to 10 GHz. In the UWB communication, data may be transferred at a higher speed, compared to existing technologies such as Bluetooth® or ZigBee®. Additionally, the UWB communication is a new wireless technology for most efficiently using limited radio resources.

Due to characteristics of a wideband system with high-speed data transmission, the UWB communication may be performed at a high sampling rate or a high sampling frequency, and a high operating rate or a high operating frequency. To reduce co-band interference caused by a communication between a heterogeneous communication system and homogeneous apparatuses, time hopping may be performed in the UWB communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a signal transmission apparatus includes a time hopping apparatus configured to calculate a difference between values of time hopping patterns corresponding to adjacent symbol transmission periods, and to determine, based on the calculated difference, whether a position of a time hopping pattern corresponding to one of the adjacent symbol transmission periods is to be adjusted, and a transmitter configured to transmit a signal in the adjacent symbol transmission periods based on a determination result obtained by the time hopping apparatus.

The time hopping apparatus may compare the calculated difference to a threshold, and may determine, based on a comparison result, whether the position is to be adjusted.

In response to the calculated difference being less than or equal to the threshold, the time hopping apparatus may adjust the position by an offset.

In response to the calculated difference being greater than the threshold, the time hopping apparatus may not adjust a position of a time hopping pattern corresponding to one of the adjacent symbol transmission periods.

The offset may be variably adjusted based on frequency accuracy of the signal transmission apparatus.

The transmitter may transmit a control signal including the offset.

The time hopping apparatus may include a hopping pattern generator configured to generate time hopping patterns corresponding to the adjacent symbol transmission periods, a calculator configured to calculate the difference between the values of the time hopping patterns, and a determiner configured to determine whether the position is to be adjusted by an offset.

The calculator may delay a time hopping pattern corresponding to an early symbol transmission period among the adjacent symbol transmission periods, and calculates a difference between a value of the delayed time hopping pattern and a value of a time hopping pattern corresponding to a late symbol transmission period among the adjacent symbol transmission periods.

The determiner may include a register configured to store the offset.

The determiner may include a look-up table (LUT) including the offset.

In another general aspect, a signal transmission method of a signal transmission apparatus includes calculating a difference between values of time hopping patterns corresponding to adjacent symbol transmission periods, determining, based on the calculated difference, whether a position of a time hopping pattern corresponding to one of the adjacent symbol transmission periods is to be adjusted, and transmitting a signal in the adjacent symbol transmission periods based on a result of the determining.

The calculating may include delaying a time hopping pattern corresponding to an early symbol transmission period among the adjacent symbol transmission periods, and calculating a difference between a value of the delayed time hopping pattern and a value of a time hopping pattern corresponding to a late symbol transmission period among the adjacent symbol transmission periods.

The determining may include comparing the calculated difference to a threshold, and determining, based on a comparison result, whether the position is to be adjusted by an offset.

The method may further include transmitting a control signal including the offset.

The offset may be variably adjusted based on frequency accuracy of the signal transmission apparatus.

The determining of whether the position is to be adjusted by the offset may include adjusting the position by the offset in response to the calculated difference being less than or equal to the threshold.

In another general aspect, a signal reception apparatus includes a time hopping apparatus configured to calculate a difference between values of time hopping patterns corresponding to adjacent symbol transmission periods, and to determine, based on the calculated difference, whether a position of a time hopping pattern corresponding to one of the adjacent symbol transmission periods is to be adjusted, and a receiver configured to receive a signal in the adjacent symbol transmission periods based on a determination result obtained by the time hopping apparatus.

The signal reception apparatus may further include a signal demodulator configured to demodulate the signal received by the receiver.

The receiver may accumulate signals received before and after a time interval based on a final value of the time hopping pattern corresponding to the adjacent symbol transmission periods.

The time hopping apparatus may compare the calculated difference to a threshold, and determines, based on a comparison result, whether the position is to be adjusted.

In response to the calculated difference being less than or equal to the threshold, the time hopping apparatus may adjust the position by an offset.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
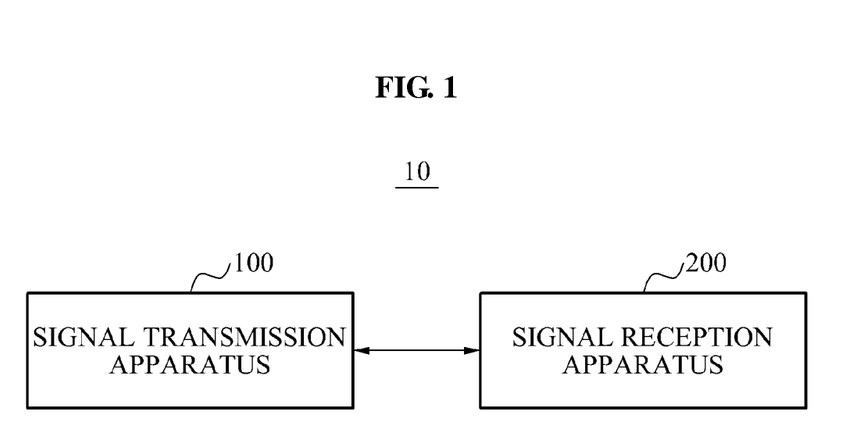
FIG. 1 is a diagram illustrating an example of a signal transmission system.

FIG. 1 illustrates a signal transmission system 10.

Referring to FIG. 1, the signal transmission system 10 includes a signal transmission apparatus 100 and a signal reception apparatus 200. In an example, the signal transmission system 10 is an ultra-wideband (UWB) system, and the signal transmission apparatus 100 and the signal reception apparatus 200 are UWB communication apparatuses.

The signal transmission apparatus 100 and the signal reception apparatus 200 are implemented, for example, as personal computers (PCs), data servers, or portable electronic devices. However, these are merely examples, and the signal transmission apparatus 100 and the signal reception apparatus 200, in other examples, are implemented as other electronic devices.

A portable electronic device is implemented, for example, as a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, or a wearable device, for example a digital hearing aid, a smart watch, a smart wristband, and other similar electronic devices that are designed to process data while being designed for easy transport.

In FIG. 1, the signal transmission apparatus 100 and the signal reception apparatus 200 communicate with each other. For example, the signal transmission apparatus 100 and the signal reception apparatus 200 exchange signals or data with each other.

In an example, the signal transmission apparatus 100 calculates a difference between values of time hopping patterns corresponding to adjacent symbol transmission periods. The signal transmission apparatus 100 determines, based on the calculated difference, whether a position of a time hopping pattern corresponding to one of the adjacent symbol transmission periods is to be adjusted. However, the present example is only one illustrative example, and in other examples a position of a time hopping pattern corresponds to each of a plurality of adjacent symbol transmission periods, and the adjusting of the position is applied to all of the corresponding plurality of adjacent symbol transmission periods. The adjusting of the position, as discussed, also potentially indicates adjusting a distance between time hopping patterns.

In this example, the signal transmission apparatus 100 compares the calculated difference with a threshold. The signal transmission apparatus 100 determines, based on a comparison result, whether a position of a time hopping pattern corresponding to one of the adjacent symbol transmission periods is to be adjusted. In an example in which the calculated difference is less than or equal to the threshold, the signal transmission apparatus 100 adjusts the position by an offset. In another example in which the calculated difference is greater than the threshold, the signal transmission apparatus 100 does not adjust a position of a time hopping pattern corresponding to the adjacent symbol transmission periods. In an aspect of such an example, the offset is variably adjusted based on frequency accuracy of the signal transmission apparatus 100. The signal transmission apparatus 100 then transmits a control signal including the offset to the signal reception apparatus 200.

The signal transmission apparatus 100 transmits a signal in the adjacent symbol transmission periods, based on a determination result of whether the position is to be adjusted.

The signal reception apparatus 200 calculates a difference between values of time hopping patterns corresponding to adjacent symbol transmission periods. Then, the signal reception apparatus 200 determines, based on the calculated difference, whether a value of a time hopping pattern that corresponds to one of the adjacent symbol transmission periods and that is adjusted by the signal transmission apparatus 100 is to be adjusted by an offset and determined as a final value. For example, the signal reception apparatus 200 acquires the offset from the control signal received from the signal transmission apparatus 100.

Additionally, in an example the signal reception apparatus 200 accumulates signals received before and after a time interval corresponding to the final value of the time hopping pattern, based on a determination result.

Figure 2:
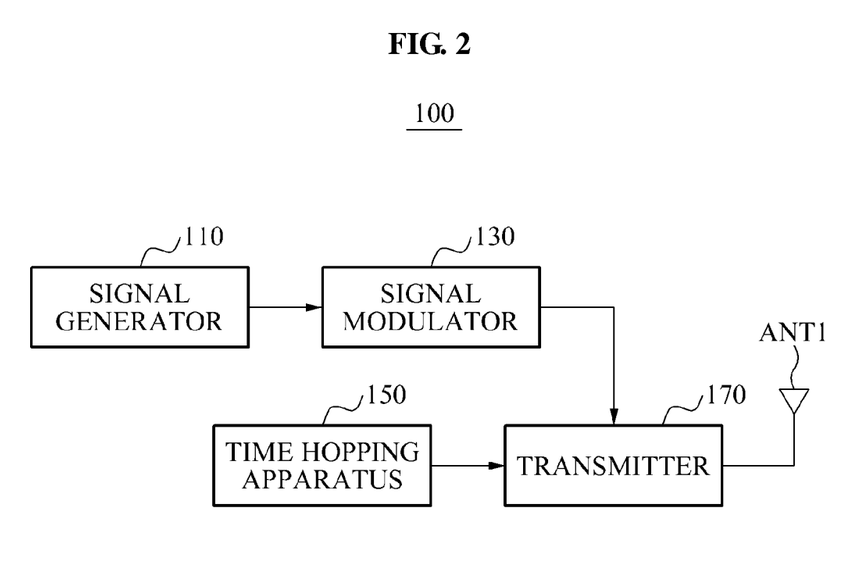
FIG. 2 is a diagram illustrating a signal transmission apparatus of FIG. 1.

FIG. 2 illustrates the signal transmission apparatus 100 of FIG. 1.

Referring to FIGS. 1 and 2, the signal transmission apparatus 100 includes a signal generator 110, a signal modulator 130, a time hopping apparatus 150, and a transmitter 170.

In the example of FIG. 2, the signal generator 110 generates a signal. The signal generator 110 transmits the generated signal to the signal modulator 130.

The signal modulator 130 receives the signal from the signal generator 110, and modulates the received signal. The signal modulator 130 transmits the modulated signal to the transmitter 170.

For example, the time hopping apparatus 150 calculates a difference between values of time hopping patterns corresponding to adjacent symbol transmission periods. The time hopping apparatus 150 determines, based on the calculated difference, whether a position of a time hopping pattern corresponding to one of the adjacent symbol transmission periods is to be adjusted. For example, the time hopping apparatus 150 compares the calculated difference to a threshold, and determines whether the position is to be adjusted. In this example, when the calculated difference is less than or equal to the threshold, the time hopping apparatus 150 adjusts the position by an offset. When the calculated difference is greater than the threshold, the time hopping apparatus 150 does not adjust a position of a time hopping pattern corresponding to the adjacent symbol transmission periods.

In the example of FIG. 2, the transmitter 170 transmits the signal output from the signal modulator 130 via an antenna ANT1. For example, the transmitter 170 transmits the signal in the adjacent symbol transmission periods, based on a determination result obtained by the time hopping apparatus 150.

In an example, the transmitter 170 transmits a control signal including an offset to the signal reception apparatus 200.

The signal transmission apparatus 100 prevents interference between signals transmitted in adjacent symbol transmission periods by adjusting a position of a time hopping pattern corresponding to one of the adjacent symbol transmission periods based on a difference between values of time hopping patterns corresponding to the adjacent symbol transmission periods.

Figure 3:
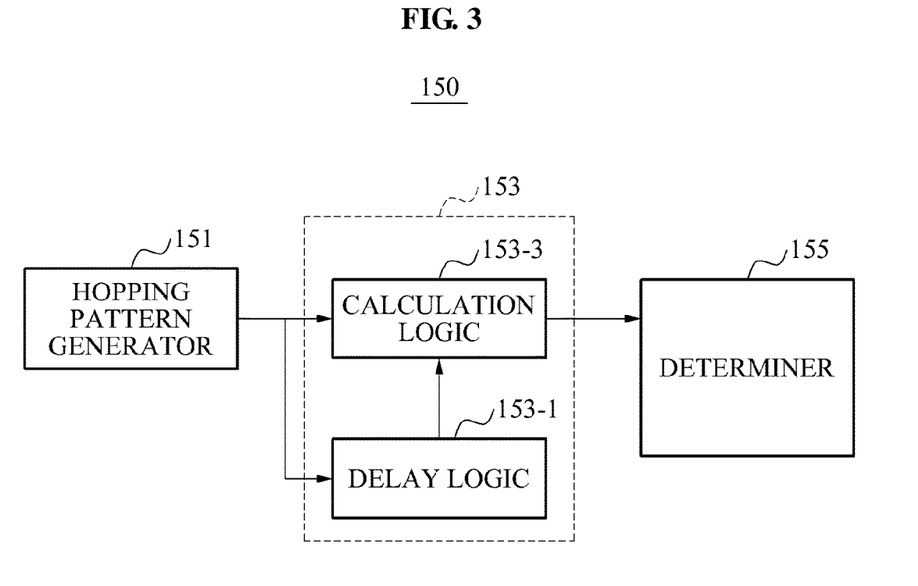
FIG. 3 is a diagram illustrating a time hopping apparatus of FIG. 2.
Figure 4:
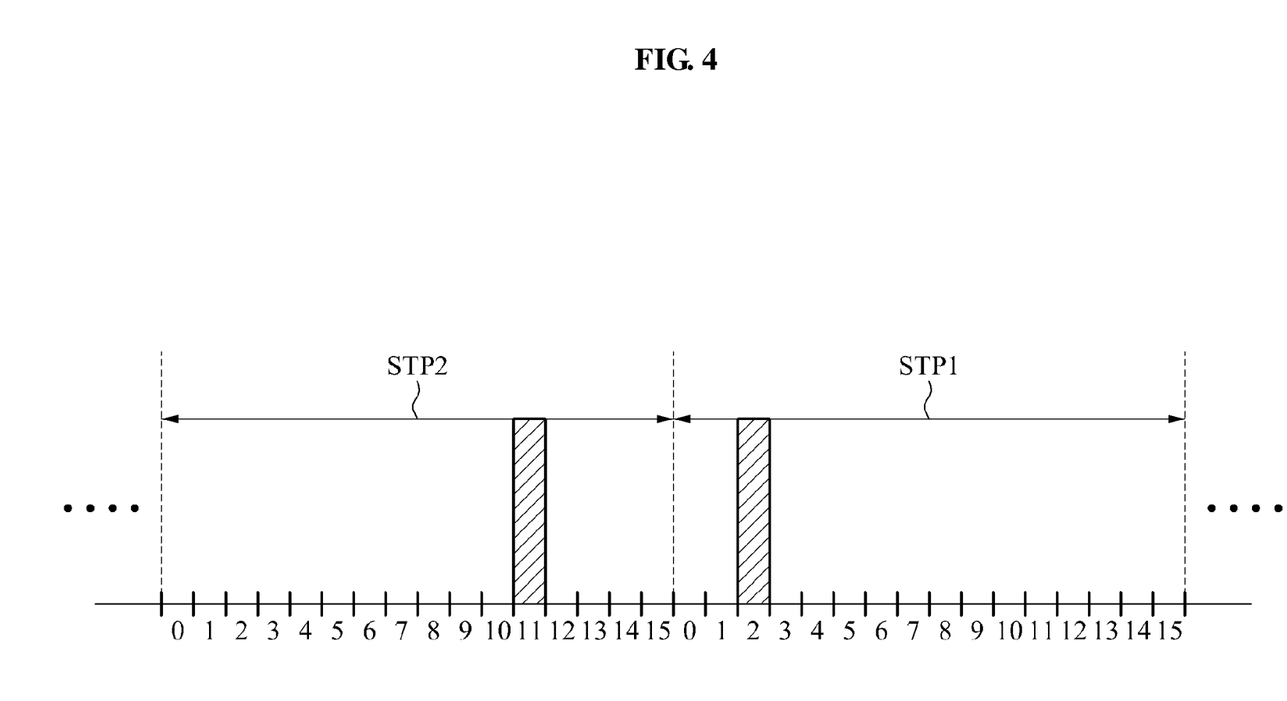
FIG. 4 is a diagram illustrating an example of symbol transmission periods to describe an operation of the time hopping apparatus of FIG. 2.

FIG. 3 illustrates the time hopping apparatus 150 of FIG. 2, and FIG. 4 illustrates an example of symbol transmission periods to describe an operation of the time hopping apparatus 150.

For convenience of description, two symbol transmission periods STP1 and STP2 are illustrated in FIG. 4.

Referring to FIGS. 1 through 4, the time hopping apparatus 150 includes a hopping pattern generator 151, a calculator 153, and a determiner 155.

Each of the symbol transmission periods STP1 and STP2 refers to a period in which a signal or symbol is transmitted. In the example of FIG. 4, the symbol transmission periods STP1 and STP2 are adjacent to each other. In an example, the symbol transmission periods STP1 and STP2 refer to signal transmission periods.

As illustrated in FIG. 4, a single symbol transmission period, such as the symbol transmission period STP1 or STP2, is divided into a plurality of time intervals. In the example of FIG. 4, the plurality of time intervals of each of STP1 and STP2 is classified by time hopping patterns with values of "0" to "15." The plurality of time intervals potentially randomly correspond to the time hopping patterns with values of "0" to "15."

The hopping pattern generator 151 generates time hopping patterns with values of "2" and "11" that respectively correspond to the symbol transmission periods STP1 and STP2. The time hopping patterns with values of "2" and "11" are referred to as time hopping patterns 2 and 11, respectively. For example, the time hopping patterns 2 and 11 correspond to signals transmitted in the symbol transmission periods STP1 and STP2, respectively. Referring to FIG. 4, the hopping pattern generator 151 generates the time hopping pattern 2 corresponding to a signal transmitted in the symbol transmission period STP1, and the hopping pattern generator 151 generates time hopping pattern 11 corresponding to a signal transmitted in the symbol transmission period STP2.

In the example of FIG. 3, the calculator 153 calculates a difference between the values of "2" and "11" of the time hopping patterns 2 and 11. In such an example, the calculator 153 includes a delay logic 153-1 and a calculation logic 153-3.

As presented in the example of FIG. 3, the delay logic 153-1 delays the time hopping patterns 2 and 11 generated by the hopping pattern generator 151. For example, the delay logic 153-1 delays the time hopping pattern 2 corresponding to the early symbol transmission period STP1, which is an earlier symbol transmission period between the symbol transmission periods STP1 and STP2. The delay logic 153-1 delays the time hopping pattern with the value of 11 corresponding to the late symbol transmission period STP2, which is a later symbol transmission period. The symbol transmission periods STP1 and STP2 are referred to as the early symbol transmission period STP1 and the late symbol transmission period STP2, respectively.

The calculation logic 153-3 calculates the difference between the values of "2" and "11" of the time hopping patterns 2 and 11. The calculated difference is, for example, an absolute value of the difference.

For convenience of description, the two symbol transmission periods STP1 and STP2 are provided to describe an operation of each of the delay logic 153-1 and the calculation logic 153-3. Each of the delay logic 153-1 and the calculation logic 153-3 continuously operates to perform their respective operations in all symbol transmission periods as described above.

The determiner 155 determines, based on the difference calculated by the calculator 153, whether a position of a time hopping pattern corresponding to one of adjacent symbol transmission periods STP1 and STP2 is to be adjusted by an offset.

Figure 5:
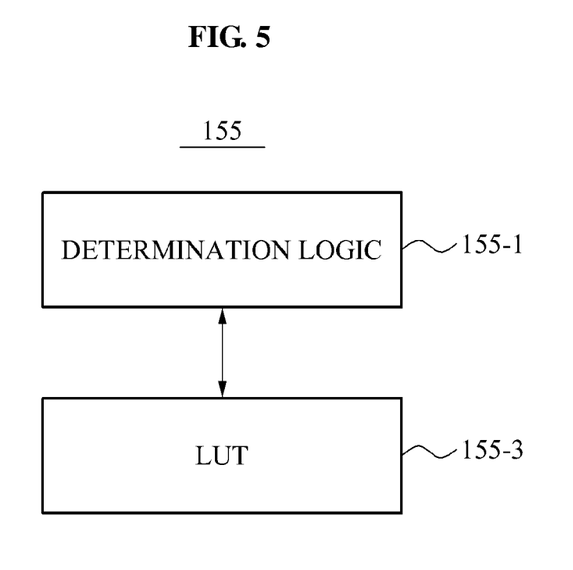
FIG. 5 is a diagram illustrating an example of a configuration of a determiner of FIG. 3.

FIG. 5 illustrates an example of a configuration of the determiner 155 of FIG. 3.

Referring to FIGS. 1 through 5, in the example of FIG. 5, the determiner 155 includes a determination logic 155-1 and a look-up table (LUT) 155-3.

The determination logic 155-1 compares the difference calculated by the calculator 153 to a threshold. The determination logic 155-1 determines, based on the comparison result, whether a position of a time hopping pattern corresponding to one of the symbol transmission periods STP1 and STP2 is to be adjusted by an offset. In an example, the offset is variably adjusted based on the frequency accuracy of the signal transmission apparatus 100.

In response to the calculated difference being less than or equal to the threshold, the determination logic 155-1 adjusts the position by the offset. In an example, the determination logic 155-1 adjusts a position of the time hopping pattern 2 corresponding to the early symbol transmission period STP1, or a position of the time hopping pattern 11 corresponding to the late symbol transmission period STP2. In another example, the determination logic 155-1 adjusts the positions of the time hopping patterns 2 and 11.

In response to the calculated difference not being greater than the threshold, the determination logic 155-1 does not adjust the positions of the time hopping patterns 2 and 11.

In the example of FIG. 5, the LUT 155-3 stores an offset. For example, the LUT 155-3 stores offsets based on the frequency accuracy of the signal transmission apparatus 100.

Figure 6:
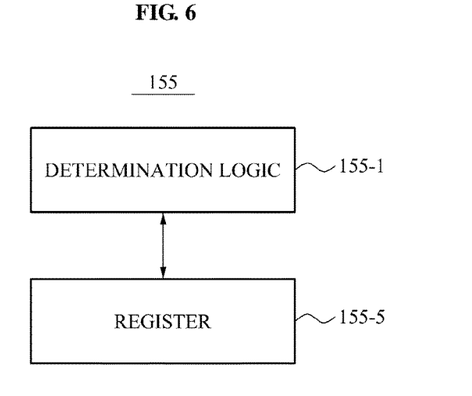
FIG. 6 is a diagram illustrating another example of the configuration of the determiner of FIG. 3.

FIG. 6 illustrates another example of the configuration of the determiner 155 of FIG. 3.

Referring to FIGS. 1 through 4 and 6, in the example of FIG. 6, the determiner 155 includes a determination logic 155-1 and a register 155-5.

In the example of FIG. 6, the determination logic 155-1 compares the difference calculated by the calculator 153 to a threshold. The determination logic 155-1 determines, based on a comparison result, whether a position of a time hopping pattern corresponding to one of the symbol transmission periods STP1 and STP2 is to be adjusted by an offset. For example, the offset is variably adjusted based on the frequency accuracy of the signal transmission apparatus 100.

In response to the calculated difference being less than or equal to the threshold, the determination logic 155-1 adjusts the position by the offset. In an example, the determination logic 155-1 adjusts a position of the time hopping pattern 2 corresponding to the early symbol transmission period STP1, or a position of the time hopping pattern 11 corresponding to the late symbol transmission period STP2. In another example, the determination logic 155-1 adjusts the positions of both time hopping patterns 2 and 11.

In response to the calculated difference being greater than the threshold, the determination logic 155-1 does not adjust the positions of the time hopping patterns 2 and 11.

The register 155-5 stores an offset. For example, the register 155-5 stores offsets based on the frequency accuracy of the signal transmission apparatus 100.

Figure 7:
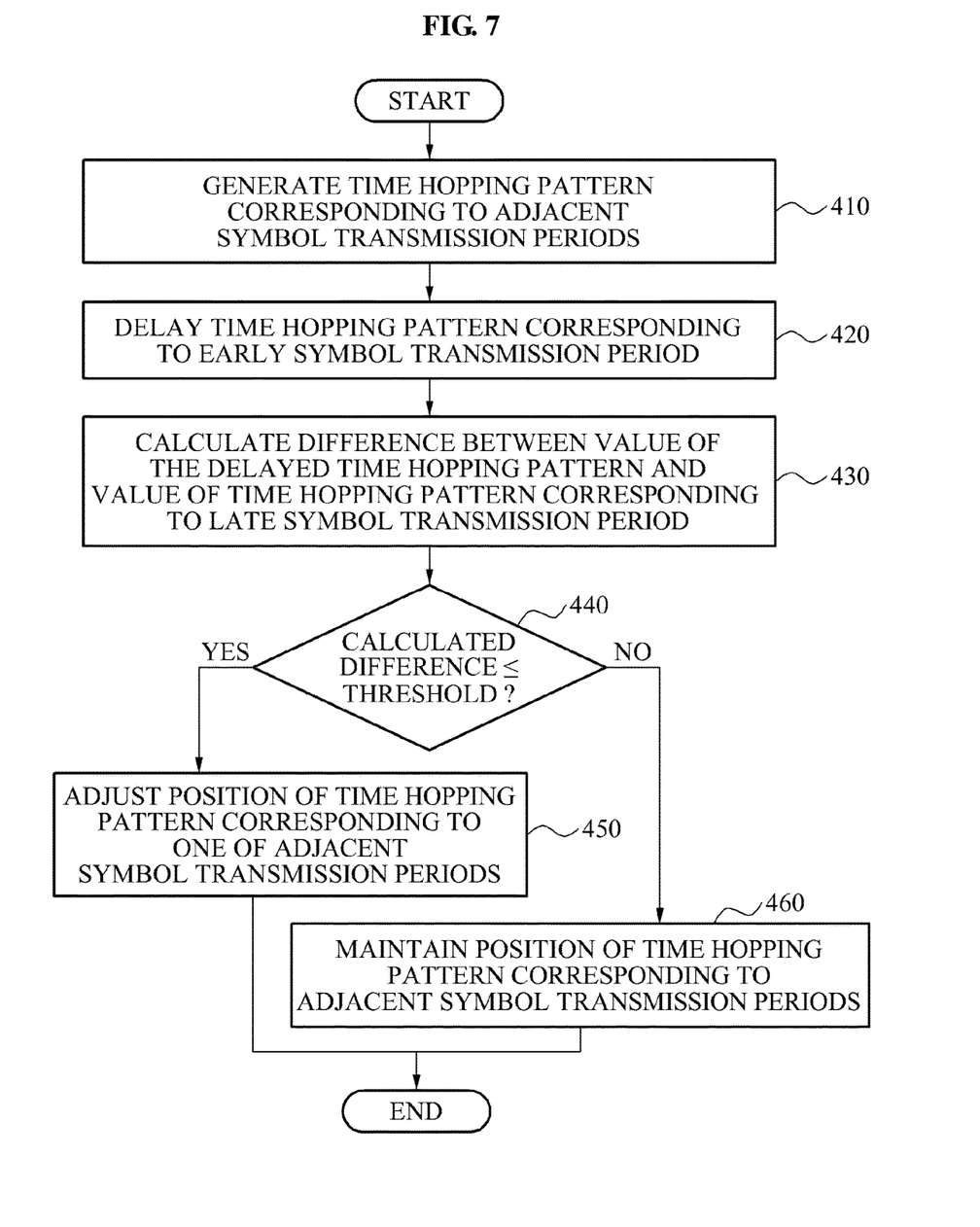
FIG. 7 is a flowchart illustrating an example of an operating method of the time hopping apparatus of FIG. 3.

FIG. 7 illustrates an example of an operating method of the time hopping apparatus 150 of FIG. 3.

Referring to FIGS. 1 through 7, in operation 410, the method generates a time hopping pattern corresponding to adjacent symbol transmission periods. For example, the hopping pattern generator 151 generates a time hopping pattern corresponding to adjacent symbol transmission periods. In such an example, the hopping pattern generator 151 generates the time hopping pattern 2 corresponding to the signal transmitted in the early symbol transmission period STP1, and the time hopping pattern 11 corresponding to the signal transmitted in the late symbol transmission period STP2.

In operation 420, the method delays a time hopping pattern corresponding to an early symbol transmission period among the adjacent symbol transmission periods. For example, the delay logic 153-1 delays a time hopping pattern corresponding to an early symbol transmission period among the adjacent symbol transmission periods. In such an example, the delay logic 153-1 delays the time hopping pattern 2 corresponding to the early symbol transmission period STP1.

In operation 430, the method calculates a difference between a value of the delayed time hopping pattern and a value of a time hopping pattern corresponding to a late symbol transmission period among the adjacent symbol transmission periods. For example, the calculation logic 153-3 calculates a difference between a value of the delayed time hopping pattern and a value of a time hopping pattern corresponding to a late symbol transmission period among the adjacent symbol transmission periods. In such an example, the calculation logic 153-3 calculates the difference between the values of "2" and "11" of the time hopping patterns 2 and 11. The calculated difference is, for example, an absolute value of such a difference.

In operation 440, the method compares the calculated difference to the threshold, and determines, based on a comparison result, whether a position of a time hopping pattern corresponding to one of the adjacent symbol transmission periods is to be adjusted by an offset. For example, the determination logic 155-1 compares the calculated difference to the threshold, and determines, based on a comparison result, whether a position of a time hopping pattern corresponding to one of the adjacent symbol transmission periods is to be adjusted by an offset. In such an example, the determination logic 155-1 compares the difference calculated by the calculator 153 to the threshold, and determines, based on a comparison result, whether a position of a time hopping pattern corresponding to one of the symbol transmission periods STP1 and STP2 is to be adjusted by an offset.

In an example in which the calculated difference is determined to be less than or equal to the threshold, the method adjusts the position by the offset in operation 450. For example, the determination logic 155-1 adjusts the position by the offset. In such an example, the determination logic 155-1 adjusts a position of the time hopping pattern 2 corresponding to the early symbol transmission period STP1, or a position of the time hopping pattern 11 corresponding to the late symbol transmission period STP2. In another example, the determination logic 155-1 adjusts the positions of the time hopping patterns 2 and 11. For example, the offset is variably adjusted based on the frequency accuracy of the signal transmission apparatus 100.

In another example in which the calculated difference is determined to be greater than the threshold, the method maintains a position of a time hopping pattern corresponding to the adjacent symbol transmission periods in operation 460. For example, the determination logic 155-1 maintains a position of a time hopping pattern corresponding to the adjacent symbol transmission periods. In such an example, the determination logic 155-1 maintains the positions of the time hopping patterns 2 and 11. In other words, the determination logic 155-1 does not adjust the positions of the time hopping patterns 2 and 11.

Figure 8:
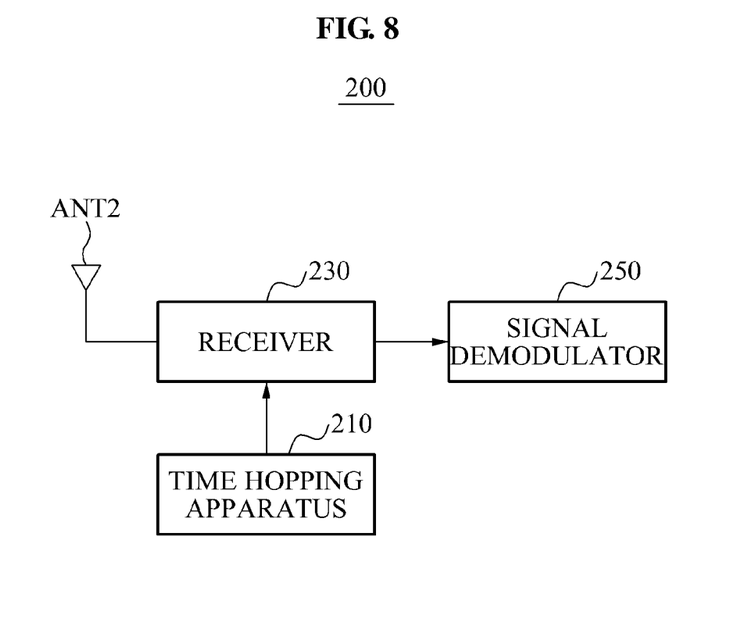
FIG. 8 is a diagram illustrating a signal reception apparatus of FIG. 1.

FIG. 8 illustrates the signal reception apparatus 200 of FIG. 1.

Referring to FIGS. 1, 4, and 8, in the example of FIG. 8, the signal reception apparatus 200 includes a time hopping apparatus 210, a receiver 230, and a signal demodulator 250.

A structure and operation of the time hopping apparatus 210 of FIG. 8 is potentially substantially the same as a structure and operation of the time hopping apparatus 150 in the signal transmission apparatus 100 of FIG. 2.

Thus, in the example of FIG. 8, the time hopping apparatus 210 calculates the difference between the values of "2" and "11" of the time hopping patterns 2 and 11, and determines, based on the calculated difference, whether a value of a time hopping pattern that corresponds to one of the symbol transmission periods STP1 and STP2 and that is adjusted by the signal transmission apparatus 100 is to be adjusted by an offset and determined as a final value. In such an example, the time hopping apparatus 210 compares the calculated difference to a threshold, and determines, based on a comparison result, whether the value of the time hopping pattern is to be adjusted by the offset and determined as a final value. In an example in which the calculated difference is less than or equal to the threshold, the time hopping apparatus 210 adjusts the value of the time hopping pattern by the offset, and determines the adjusted value as a final value. In another example in which the calculated difference is greater than the threshold, the time hopping apparatus 210 does not adjust, by the offset, a value of a time hopping pattern corresponding to the symbol transmission periods STP1 and STP2.

The receiver 230 receives a signal output from the signal transmission apparatus 100 via an antenna ANT2. For example, the receiver 230 accumulates signals received before and after a time interval corresponding to the final value of the time hopping pattern based on a determination result obtained by the time hopping apparatus 210.

In the example of FIG. 8, the signal demodulator 250 demodulates a signal received from the receiver 230.

The signal reception apparatus 200 accumulates signals received before and after a time interval based on a final value of a time hopping pattern corresponding to one of adjacent symbol transmission periods. Accordingly, the signal reception apparatus 200 is able to stably communicate with the signal transmission apparatus 100 without a need to track synchronization.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A signal transmission apparatus, comprising:
a time hopping apparatus configured to calculate a difference between values of time hopping patterns corresponding to adjacent symbol transmission periods, and to determine, based on the calculated difference, whether a position of a time hopping pattern corresponding to one of the adjacent symbol transmission periods is to be adjusted; and
a transmitter configured to transmit a signal in the adjacent symbol transmission periods based on a determination result obtained by the time hopping apparatus,
wherein the time hopping apparatus comprises
a hopping pattern generator configured to generate time hopping patterns corresponding to the adjacent symbol transmission periods,
a calculator configured to calculate the difference between the values of the time hopping patterns, and
a determiner configured to determine whether the position is to be adjusted by an offset.

2. The signal transmission apparatus of claim 1, wherein the time hopping apparatus compares the calculated difference to a threshold, and determines, based on a comparison result, whether the position is to be adjusted.

3. The signal transmission apparatus of claim 2, wherein in response to the calculated difference being less than or equal to the threshold, the time hopping apparatus adjusts the position by an offset.

4. The signal transmission apparatus of claim 3, wherein the offset is variably adjusted based on frequency accuracy of the signal transmission apparatus.

5. The signal transmission apparatus of claim 3, wherein the transmitter transmits a control signal comprising the offset.

6. The signal transmission apparatus of claim 2, wherein in response to the calculated difference being greater than the threshold, the time hopping apparatus does not adjust a position of a time hopping pattern corresponding to one of the adjacent symbol transmission periods.

7. The signal transmission apparatus of claim 1, wherein the calculator delays a time hopping pattern corresponding to an early symbol transmission period among the adjacent symbol transmission periods, and calculates a difference between a value of the delayed time hopping pattern and a value of a time hopping pattern corresponding to a late symbol transmission period among the adjacent symbol transmission periods.

8. The signal transmission apparatus of claim 1, wherein the determiner comprises a register configured to store the offset.

9. The signal transmission apparatus of claim 1, wherein the determiner comprises a look-up table (LUT) comprising the offset.

10. A signal transmission method of a signal transmission apparatus, the signal transmission method comprising:
generating time hopping patterns corresponding to adjacent symbol transmission periods;
calculating a difference between values of the time hopping patterns corresponding to the adjacent symbol transmission periods;
determining, based on the calculated difference, whether a position of a time hopping pattern corresponding to one of the adjacent symbol transmission periods is to be adjusted; and
transmitting a signal in the adjacent symbol transmission periods based on a result of the determining.

11. The signal transmission method of claim 10, wherein the calculating comprises:
delaying a time hopping pattern corresponding to an early symbol transmission period among the adjacent symbol transmission periods; and
calculating a difference between a value of the delayed time hopping pattern and a value of a time hopping pattern corresponding to a late symbol transmission period among the adjacent symbol transmission periods.

12. The signal transmission method of claim 10, wherein the determining comprises:
comparing the calculated difference to a threshold; and
determining, based on a comparison result, whether the position is to be adjusted by an offset.

13. The signal transmission method of claim 12, further comprising:
transmitting a control signal comprising the offset.

14. The signal transmission method of claim 12, wherein the offset is variably adjusted based on frequency accuracy of the signal transmission apparatus.

15. The signal transmission method of claim 12, wherein the determining of whether the position is to be adjusted by the offset comprises adjusting the position by the offset in response to the calculated difference being less than or equal to the threshold.

16. A signal reception apparatus, comprising:
a time hopping apparatus configured to calculate a difference between values of time hopping patterns corresponding to adjacent symbol transmission periods, and to determine, based on the calculated difference, whether a position of a time hopping pattern corresponding to one of the adjacent symbol transmission periods is to be adjusted; and
a receiver configured to receive a signal in the adjacent symbol transmission periods based on a determination result obtained by the time hopping apparatus,
wherein the time hopping apparatus comprises a hopping pattern generator configured to generate time hopping patterns corresponding to the adjacent symbol transmission periods, a calculator configured to calculate the difference between the values of the time hopping patterns, and a determiner configured to determine whether the position is to be adjusted by an offset.

17. The signal reception apparatus of claim 16, further comprising:

a signal demodulator configured to demodulate the signal received by the receiver.

18. The signal reception apparatus of claim 16, wherein the receiver accumulates signals received before and after a time interval based on a final value of the time hopping pattern corresponding to the adjacent symbol transmission periods.

19. The signal transmission apparatus of claim 16, wherein the time hopping apparatus compares the calculated difference to a threshold, and determines, based on a comparison result, whether the position is to be adjusted.

20. The signal transmission apparatus of claim 19, wherein in response to the calculated difference being less than or equal to the threshold, the time hopping apparatus adjusts the position by an offset.

* * * * *